INVENTOR
EMORY LLOYD JOHNSON
BY Williamson, Williamson,
Schroeder & Adams
ATTORNEYS

United States Patent Office 2,807,911
Patented Oct. 1, 1957

2,807,911

AIDING POLLENATION OF ALFALFA

Emory Lloyd Johnson, Winnebago, Minn.

Application July 27, 1953, Serial No. 370,319

5 Claims. (Cl. 47—58)

This invention relates to aiding pollenation of alfalfa and more particularly to apparatus and a method for mechanically stimulating the pollenation of the alfalfa flower to produce generally increased yield of seed over natural methods of pollenation.

It has been known for a number of years that the alfalfa flower is peculiar in that the stamen thereof is surrounded by a pod structure which, if it does not burst or become disrupted, will prevent the scattering of pollen to the pistils of the plant and, under certain conditions, the seed producing ability of an entire field of alfalfa may be so impaired that the yield is not worth harvesting.

Alfalfa is primarily a forage plane which may be cut several times during the growing season without regard to the flowering or maturing of the plant. When, however, it is desired to permit the plant to mature and to harvest seed therefrom certain natural conditions must prevail in order to get worthwhile yield of the seed product. One of the requirements for producing a good yield of seed by natural means is that the weather be hot and dry during the maturing of the flower and that some force be supplied to cause impact between the pods or otherwise to cause the pod to open. This phenomenon is pointed out in the early Patent Number 1,306,209 issued in 1919 to Williams. This natural force is generally supplied by a moderate or high wind during hot and dry days or may be supplied by the activity of bees in their search for pollen.

The prior art devices, however, teach slow and laborious processes where artificial winds are created to knock the pods together and drying atmospheres supplied to permit the pollen to form a dust which can be carried by the moving air to neighboring pistils and thereby fertilize them.

It is my purpose to supply apparatus and a method whereby these slow and laborious processes can be replaced by simple speedy means which will create the desired pollenation in but a fraction of the time.

It is therefore a general object of this invention to provide an apparatus and a method for causing the artificial pollenation of ripe alfalfa flowers by simple impacting force followed by a bending of the alfalfa plant and allowing it to spring back in an atmosphere of turbulent air.

It is a further object of the invention to provide an apparatus for effecting the above described pollenation which will employ an impacting element having a smooth surface and providing a flat impacting portion, a medial bending portion and a trailing edge for treating the alfalfa in the above described manner.

It is a further object of the invention to provide a very simple and speedy method of treating large acreages of alfalfa at selected optimum times whereby to take advantage of natural conditions conducive to the germination of the alfalfa, irrespective of the presence of natural forces such as high winds and high population of bees.

It is a further object of the invention to provide an apparatus and process for the mechanical pollenation of alfalfa wherein a blade element traveling at a high rate of speed will impart a single impacting force to the alfalfa plant to open the pod thereof followed by a simultaneously created turbulence which will loosen and broadcast the pollen to neighboring pistils.

These and other objects and advantages of my invention will more fully appear from the following description made in connection with the accompanying drawings wherein like reference characters refer to similar parts throughout the several views and in which.

Figure 1:
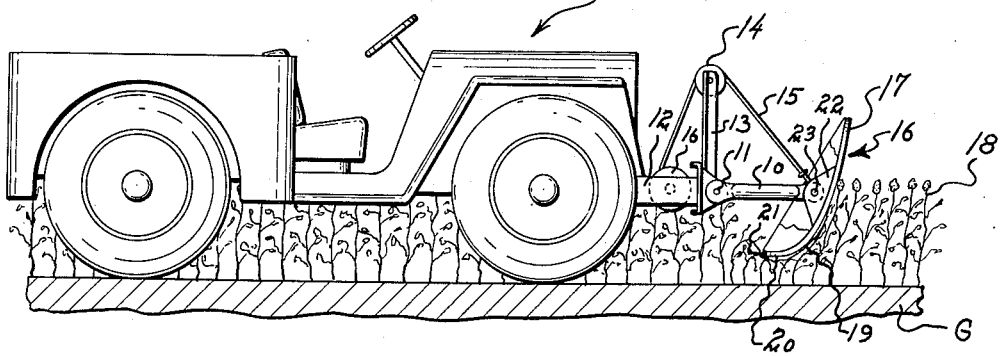
Fig. 1 is a side elevation of one form of my mechanical pollenating apparatus in mounted relation at the fore of a suitable vehicle, the vehicle and blade being shown in forward movement in an alfalfa field.
Figure 2:
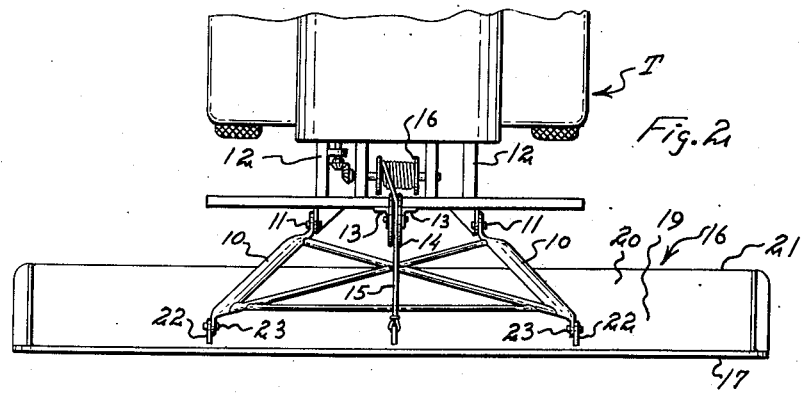
Fig. 2 is a plan view of my apparatus mounted to a vehicle, the rear portion of the vehicle being cut away.

Referring now more particularly to the drawing, my invention comprehends an apparatus to be mounted on a vehicle such as the truck T at a position forwardly thereof and in spaced clearance with the ground G as shown. The mounting structure may comprise a braced framework 10 pivotally mounted at 11 to the forward projecting frame structure 12 of the truck T. An upstanding rigid standard structure 13 may be supplied with a pulley 14 over which a cable 15 rides, one end of which is in winding contact with the spool 16, driven by power means (not shown) associated with truck T, and the other end of which is secured to the outwardly extending end of the framework 10 as shown. Forwardly of the framework 10 and mounted thereto is a laterally elongated impacting, bending and air-turbulating element 16 which has along the upper horizontal margin 17 thereof a vertical surface for contacting with impact at high speed the sides of alfalfa plants 18. At a lower position along the horizontal element is a downwardly and rearwardly curved extension 19 for causing the alfalfa plants 18 to bend forwardly after having been struck with impacting force by the vertical portion 17. The element 16 further has a horizontal rearward extending portion 20 which curves substantially into a plane parallel with ground G and terminates rearwardly in a free edge 21. Suitable bracket means 22 may be supplied upon the rear portion of the impacting, bending and air-turbulating element 16 and adjustable pivot means 23 may be employed to angulate the entire element 16 in radial relation with pivot point 23.

Figure 3:
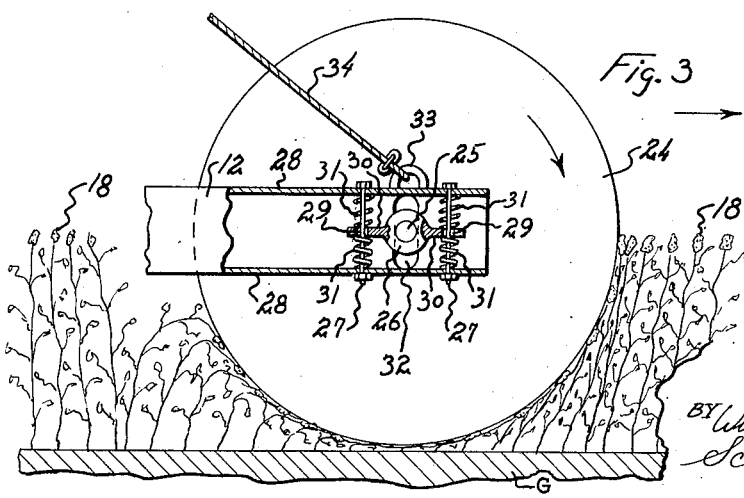
Fig. 3 is another embodiment of my invention in which the mechanical impacting element is cylindrical and the attaching structure for mounting to a vehicle is shown in fragment.

Another form of my invention is shown in Fig. 3, the impacting, bending and air-turbulating element 24 constituting a cylindrical laterally disposed element having its axis substantially parallel with the ground G. An axle member 25 may be mounted centrally of the cylinder 24 for turning at each end in a journal 26 which in turn may be resiliently mounted upon the forward extending frame 12 of the truck T. The resilient mounting may comprise bars or bolts 27 secured across flanges 28 of the frame 12, the bars or bolts 27 passing through openings 29 passing through laterally projecting ears 30 forming a rigid part of the journal 26. The axle 25 is thus permitted through action of opposed springs 31 mounted on each bolt 27 at each side of the ears 30 to oscillate upwardly and downwardly in the slot 32 in the frame 12 through which the axle 25 projects. An anchor member 33 is rigidly attached to the outer end of the frame 12 and cable 34 may be attached thereto and extend over a pulley and to a spool or a winch similar to the elements 14 and 16 of Fig. 1.

In carrying out my process by means of my apparatus I adjust the element 16 to the proper height with respect to the ground so that the ripe pods of the alfalfa 18 will strike the upstanding area of the element. In such position, there should be a clearance of several inches between the element and the ground. The length of the element 16 may be varied substantially according to the power of the vehicle T and the size of the operation involving the mechanical pollenation. The vehicle T is then driven at a rate of speed varying from ten miles an hour up to thirty-five miles an hour, preferably in the range of twenty to twenty-five miles per hour. As can readily be seen, a blade element 16 of only a few feet in length can nevertheless pollenate an extremely large acreage in a single day.

As the vehicle T is driven forwardly, the impacting, bending and air-turbulating element 16 strikes the ripe pod of the alfalfa with a single impacting force sufficient to cause the pod to burst open. This force, however, does not necessarily shake loose the pollen and distribute it to the nearby pistils of the alfalfa plants. The upstanding plants are therefore bent forwardly without incurring any sharp edges or abutments on the smoothly flowing lines of the element and are disposed at substantially almost a horizontal position as the element 16 travels over the ground. As the ends of the plants leave the trailing edge 21 they spring upwardly jarring loose the pollen from the stamen which in turn is broadcast to adjoining pistils by the turbulence of the rapidly moving blade 16 through the air. Air currents are caused to pass under the blade 16 in the clearance space provided between the blade and the ground and other currents pass over the top of the blade to meet in a tumbling and turbulent manner to the rear of the blade. This turbulent air cooperates with the upwardly springing open pods to distribute the pollen as previously described.

Referring to the alternate form shown in Fig. 3 substantially the same action is obtained in the forward movement of the cylindrical element 24. The leading area of the cylindrical circumference strikes the pods at substantially the same position as in the first mentioned form, the cylinder being permitted to turn under frictional resistance with the plants in a clockwise direction as viewed in Fig. 3. Here again, a slight clearance is preferably maintained between the cylinder and the ground and uneven contours of the terrain may be compensated for by the resilient mounting interposed between the truck framework 12 and the cylinder axle 25. It is understood, of course, that the cylinder can actually contact the ground where particularly drastic treatment is desired. The weight applied should not be so great, however, as to damage the plants and the forward speed is naturally slowed down where there is rolling contact between the cylinder and the ground. The forwardly moving cylinder likewise creates turbulent air streams passing at least over the cylinder, and the pods are similarly exposed during their upward springing movement to a turbulent atmosphere conductive to spreading of pollen to the nearby pistils.

It may thus be seen that I have devised an inexpensive and efficient means for mechanically pollenating alfalfa and particularly in view of the ability of my apparatus and method to avail itself of a single propitious day under which conditions are ideal for pollenating alfalfa. This is an extremely important attribute of my invention in view of the fact that ofttimes there are but a few suitable days during the growing season in which such mechanical pollenation can be effectively employed.

It will, of course, be understod that various changes may be made in the form, details, arrangement and proportions of the parts without departing from the scope of my invention.

What I claim is:

1. The rapid method of pollenating a flowering alfalfa plant having pods with pollent bearing stamens and pistils associated therewith, which consists in striking the pods thereof with a smoothly surfaced implement to cause by a single impact alone the forcible opening of the pods and the projection of the stamens from within the pods, causing the plants and pods to bend over immediately thereafter, creating a turbulent air condition to the rear of the impacting implement, and permitting the plant to spring back to substantially its original position in an atmosphere of turbulent air.

2. The rapid method of pollenating a flowering alfalfa plant having pods with pollen bearing stamens and pistils associated therewith which consists in moving in parallel relation to the ground an implement having an upstanding forwardly directed smooth surface which extends downwardly and rearwardly, striking the pods of the alfalfa plant with the forwardly directed smooth surface at a speed capable of forcibly opening the pods by single impact alone, rapidly bending downwardly the entire plant including the opened pods while maintaining contact with said smooth surface at its downward and rearward portion, creating an air turbulence in the rearward vicinity of said implement while moving at said speed, then suddenly releasing the plant to permit it to spring upwardly in an atmosphere of said turbulent air and thereby causing the pollen within the pod to be loosened and broadcast from the stamens to nearby pistils of alfalfa plants.

3. Apparatus for effecting pollenation of ripe alfalfa pods which comprises an elongated horizontally disposed impacting, bending and air-turbulating implement having an upwardly extending surface for impacting at high forward speeds the pods of the alfalfa plants, said implement extending downwardly and rearwardly to cause substantially the entire plants immediately after impacting contact therewith to bend forwardly as the implement passes thereover, said implement further extending smoothly downward to a substantially horizontal portion adapted to travel in proximity to the surface of the ground and defining an open space rearwardly thereof from which the bent alfalfa plants will suddenly spring upwardly, the forwardly moving implement causing air to pass therearound to create a turbulent air condition in the area of the upwardly springing alfalfa plants.

4. Apparatus for effecting pollenation of ripe alfalfa pods which comprises an elongated horizontally disposed impacting, bending and air-turbulating blade having an upwardly extending and substantially vertical horizontal margin for impacting at high forward speeds over the ground the sides of the alfalfa plants in the area of their pods, said blade curving downwardly and rearwardly in parallel clearance with the ground to cause the plants immediately after impacting to bend forwardly as the curved blade passes thereover, said blade terminating downwardly and rearwardly in a substantially horizontal margin having a trailing edge from which the bent alfalfa plants will suddenly spring upwardly, the forwardly moving blade causing air to pass downwardly beneath said blade and over the top thereof to create a turbulent air condition in the area of the upwardly springing alfalfa plants.

5. The method of pollenating a ripe alfalfa plant having unopened pods with pollen-bearing stamens and pistils associated therewith which consists in striking the pods with impact force only at one side thereof, instantly bending over substantially the entire alfalfa plant, creating a turbulent atmosphere in the vicinity of the plant, and permitting the plant to spring upwardly to release its power into the turbulent atmosphere.

References Cited in the file of this patent

UNITED STATES PATENTS

| | | |
|---|---|---|
| 1,866,219 | Nielsen | July 5, 1932 |
| 2,709,320 | Chepil | May 31, 1955 |

FOREIGN PATENTS

| | | |
|---|---|---|
| 550,728 | Germany | May 19, 1932 |